United States Patent
Heath, III et al.

(10) Patent No.: US 8,661,444 B2
(45) Date of Patent: Feb. 25, 2014

(54) CREATION OF FLEXIBLE WORKFLOWS USING ARTIFACTS

(75) Inventors: Fenno F. Heath, III, Woodbridge, CT (US); Richard B. Hull, Chatham, NJ (US); Rong Liu, Sterling, VA (US); Anil Nigam, Stamford, CT (US); Florian Pinel, New York, NY (US); Frederick Y. Wu, Greenwich, CT (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 13/109,560

(22) Filed: May 17, 2011

(65) Prior Publication Data

US 2012/0297390 A1    Nov. 22, 2012

(51) Int. Cl.
    *G06F 9/46* (2006.01)
(52) U.S. Cl.
    USPC .......................................... 718/102; 718/105
(58) Field of Classification Search
    None
    See application file for complete search history.

(56) References Cited

U.S. PATENT DOCUMENTS

| | | | |
|---|---|---|---|
| 6,968,343 B2 * | 11/2005 | Charisius et al. | 1/1 |
| 7,979,840 B2 * | 7/2011 | Zhang et al. | 717/104 |
| 8,037,453 B1 * | 10/2011 | Zawadzki | 717/123 |
| 8,181,150 B2 * | 5/2012 | Szpak et al. | 717/104 |
| 8,225,283 B2 * | 7/2012 | Singh et al. | 717/121 |
| 8,234,621 B2 * | 7/2012 | Killisperger et al. | 717/101 |
| 2006/0064335 A1 * | 3/2006 | Goldszmidt et al. | 705/7 |
| 2007/0250812 A1 * | 10/2007 | Sanghvi et al. | 717/117 |
| 2007/0282692 A1 | 12/2007 | Bishop et al. | |
| 2008/0208670 A1 * | 8/2008 | Goldszmidt et al. | 705/8 |
| 2011/0093406 A1 * | 4/2011 | Angel et al. | 705/348 |

OTHER PUBLICATIONS

Aalst, .M.P. van der and M. Pesic, DecSerFlow: Towards a Truly Declarative Service Flow Language, Proc. 3rd Int'l Workshop Web Services and Formal Methods (WS-FM 06), LNCS 4184, Springer, 2006, pp. 1-23.

(Continued)

*Primary Examiner* — Van Nguyen
(74) *Attorney, Agent, or Firm* — Cantor Colburn LLP; William Stock (57) ABSTRACT

Execution of flexible workflows using artifacts is described. A workflow execution engine is configured to instantiate a process execution (PE) artifact. The PE artifact includes one or more transitions. The workflow execution engine is further configured to execute the one or more transitions and determine if any of the one or more transitions are new or modified. The workflow execution engine is additionally configured to load and execute new or modified transitions, without reinstantiating the PE artifact, responsive to determining that at least one new or modified transitions exist.

20 Claims, 8 Drawing Sheets

(56) References Cited

OTHER PUBLICATIONS

Aalst, W.M.P. van der, Jablonski, S. Dealing with Workflow Change: Identification of Issues and Solutions, International Journal of Computer Systems Science & Engineering, 15(5):267-276, 2000.

Pesic, M., Aalst, W.M.P. van der. A declarative approach for flexible business processes management. In J. Eder, S. Dustdar (Eds.), Business Process Management Workshops 2006, LNCS 4103: 169-180, Springer.

Pesic, M., Schonenberg, M.H., Sidorova, N., and Aalst, W.M.P. van der. Constraint based workflow models: change made easy, in Proceedings of OTM Confederated International Conferences CoopIS, DOA, ODBASE, GADA, and IS 2007, 2007, pp. 77-94.

Reichert, M and Dadam, P. ADEPT flex-Supporting Dynamic Changes of Workflows without Losing Control Export, Journal of Intelligent Information Systems 10(2):93-129.

Schonenberg, M.H., Mans, R.S., Russell, N.C., Mulyar, N.A., Aalst, W.M.P. van der. Process flexibility: A survey of contemporary approaches. CEUR Workshop Proceedings, Lecture Notes in Business Information Processing, vol. 10, pp. 16-30, 2008.

* cited by examiner

Activities

| ID | Activity Name | Planned Start | Planned End | Skip |
|---|---|---|---|---|
| 1 | Send Request to Engagement Team | | | No |
| 2 | Review Request | | | No |
| 3 | Assign Engagement Manager | | | No |
| 4 | Assign Engagement Architect | | | No |
| 5 | Hold Initial Meeting with Client | | | No |
| 6 | Create Client Record in Portal | | | No |

Activity Dependencies

| Name | Source | Target | Activity Type |
|---|---|---|---|
| | 1 | 2 | |
| | 2 | 3 | |
| | 2 | 4 | |
| | 3 | 5 | |
| | 4 | 5 | |
| | 5 | 6 | |

CREATION OF FLEXIBLE WORKFLOWS USING ARTIFACTS

BACKGROUND

Process based companies generally implement process workflows in order to streamline and standardize business processes. Although companies want the repeatability and predictability of standardized processes, they cannot be bound by rigid workflow designs because their business needs change, sometimes as often as every week or even every day. However, the technologies that implement most workflow process solutions are not compatible with frequent changes. For example, workflow technology is typically implemented in two phases, the design phase and the run-time phase.

In the design phase, the collection of activities and their sequencing logic is defined in a process schema, which includes as many alternative paths as the designer knows or decides to include. At run-time, these activities are executed rigidly according to the schema. Design is the responsibility of system analysts, with skill in workflow modeling, while at run-time, business users generally follow the process schema, but sometimes experience exception situations that call for deviations from the rigid schema.

The sharp separation between design time and run-time phases, aggravated by the need for business users to communicate changes to the modeling team, contribute to business users' perception that workflow systems are inflexible and unresponsive to business requirements. As a result, many approaches to process flexibility have been proposed. These approaches can accommodate process variation, to some extent, by introducing declarative constraints in process schemas, or allowing some controlled alteration of schemas created dynamically. Complex consequences can arise from the changes, such as the need to check correctness and consistency of the process steps, and workflow migration of in-flight workflow instances from the original design to the changed design. In general, these techniques deal with only a limited range of process changes through careful, a priori design and the achieved flexibility does not satisfy the need for ad hoc change. In some domains, users need to deviate from processes, and even violate predefined constraints, at run-time, on a case-by-case basis. For example, in medicine, a physician sets up a treatment plan for a patient based on an initial diagnosis. The treatment plan defines a process for caregivers to follow. However, as the patient's condition changes, the physician needs to alter the plan on the fly. Using current systems, this can only be done by modifying and deploying an exception workflow from development to the run-time environment, which interrupts the existing run-time workflow, and typically requires the services of the workflow modeling team.

SUMMARY

An embodiment includes a system for execution of flexible workflows using artifacts. The system includes a workflow execution engine configured to execute on a computer processor. The workflow execution engine instantiates a process execution (PE) artifact, the PE artifact is represented by a finite state machine including one or more state transitions. The system is further configured to execute the one or more transitions and determine if any of the one or more transitions are new or modified. The system is additionally configured to load and execute new or modified transitions, without reinstantiating the PE artifact, responsive to determining that at least one new or modified transitions exist.

Another embodiment is a method for execution of flexible workflows using artifacts. The method includes instantiating, by a computer, a process execution (PE) artifact, the PE artifact comprising a finite state machine with one or more state transitions. The method further includes executing, with the computer, the one or more transitions, and determining if any of the one or more transitions are new or modified. The method additionally includes loading and executing new or modified transitions, without reinstantiating the PE artifact, responsive to determining that at least one new or modified transitions exist.

Yet another embodiment includes a computer program product for execution of flexible workflows using artifacts. The computer program product includes a tangible storage medium readable by a processing circuit and storing instructions for execution by the processing circuit, the instructions for performing a method, the method including instantiating a process execution (PE) artifact, the PE artifact comprising a finite state machine with one or more state transitions. The method additionally includes executing the one or more transitions and determining if any of the one or more transitions are new or modified; and loading and executing new or modified transitions, without reinstantiating the PE artifact, responsive to determining that at least one new or modified transitions exist.

Additional features and advantages are realized through the techniques of the present embodiment. Other embodiments and aspects are described herein and are considered a part of the claimed invention. For a better understanding of the invention with its advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

An embodiment includes an artifact-centric approach that enables dynamic changes to workflow processes. In the artifact-centric approach to a workflow, a workflow process design consists of multiple interacting artifacts. In an embodiment, each artifact has an information model and a lifecycle model. During run-time, the artifact's information content is updated as the artifact progresses along its lifecycle towards process goals. In an embodiment, process schemas are incorporated into the artifact's information content. In an embodiment, the content of the information model is modified during run-time, and therefore, any process instance schemas based on the information model can be dynamically adjusted as the artifact evolves throughout its lifecycle. Through these dynamic adjustments, a workflow process can be altered, at run time, while it is being executed, without requiring a restart of the server or the workflow process.

In an embodiment, a two-tier workflow structure is implemented in which both tiers are modeled with artifacts. Each artifact has an information model and a lifecycle model. In an embodiment, the lifecycle can be modeled as a finite state machine. In an embodiment, the first tier includes a process management (PM) artifact. The PM artifact has a generic lifecycle model and an information model that has references to a set of process execution (PE) artifact instances, which constitute the second tier. In an embodiment, this PE artifact set can consist of multiple instances of multiple PE artifact types that are designed to interact to execute a process.

In an embodiment, the PM artifact manages creation and modification of these PE artifact set instances. In an embodiment, when a PE artifact set instance is created, the PM artifact instance invokes its PE plan. The PE plan instantiates at least one PE artifact. In an embodiment, the PE artifact instance instantiates other PE artifact instances in the PE artifact set as needed to execute one process instance. PE artifact lifecycle transitions invoke transition service flows that are also stored in the information model of the PM artifact. In an embodiment, each PM artifact instance creates and manages one or more instances of this PE artifact set, which corresponds to managing one or more process instances.

Figure 1:
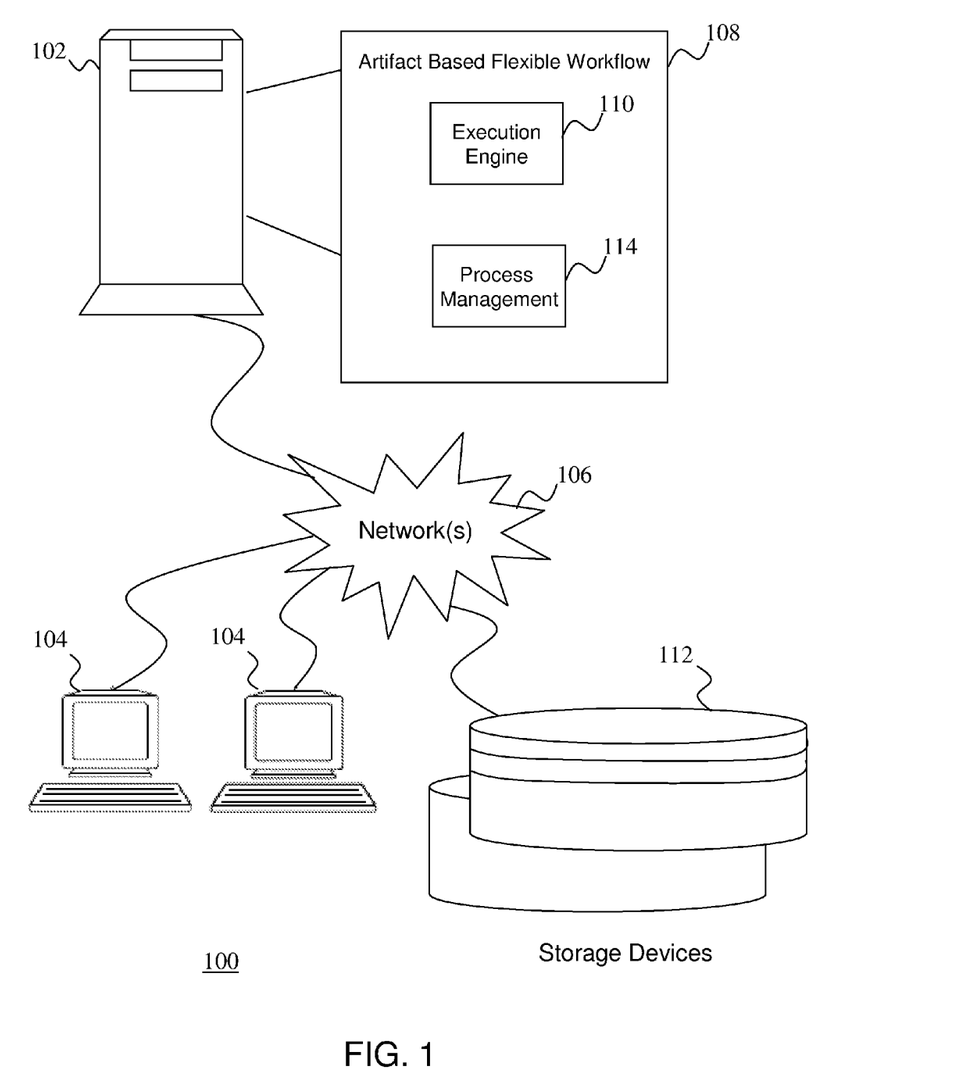
FIG. 1 illustrates a system for implementing an artifact based flexible workflow in accordance with an embodiment.

FIG. 1 illustrates a system for implementing an artifact based flexible workflow in accordance with an embodiment. FIG. 1, which includes a system 100 for implementing an artifact based flexible workflow module 108, will now be described. In an exemplary embodiment, the system 100 includes a host system computer 102 executing computer instructions for implementing the artifact based flexible workflow module 108. Host system computer 102 may operate in any type of environment that is capable of executing a software application. Host system computer 102 may comprise a high-speed computer-processing device, such as a mainframe computer, to manage the volume of operations governed by an entity for which the method of implementing the artifact based flexible workflow module 108 is executing. In an exemplary embodiment, the host system computer 102 is part of an enterprise (e.g., a commercial business) that implements the artifact based flexible workflow module 108.

The artifact based flexible workflow module 108 includes a workflow execution engine 110. The workflow execution engine 110 executes one or more PE artifacts and one or more process management modules 114. The one or more process management modules 114 manage the PE artifacts, and instantiate and manage one or more PE artifact instances. In an embodiment, the one or more process management modules 114 manage the PE artifact instances by manipulating the data underlying the PE artifact instance as will be described in more detail below.

In an exemplary embodiment, the system 100 depicted in FIG. 1 includes one or more client systems 104 through which users at one or more geographic locations may contact the host system computer 102. The client systems 104 are coupled to the host system computer 102 via one or more networks 106. Each client system 104 may be implemented using a general-purpose computer executing a computer program for carrying out the processes described herein. The client systems 104 may be personal computers (e.g., a lap top, a personal digital assistant, a mobile device) or host attached terminals. If the client systems 104 are personal computers, the processing described herein may be shared by a client system 104, and the host system computer 102 (e.g., by providing an applet to the client system 104). Client systems 104 may be operated by authorized users (e.g., programmers) of the system for implementing the artifact based flexible workflow module 108 described herein.

The networks 106 may be any type of known network including, but not limited to, a wide area network (WAN), a local area network (LAN), a global network (e.g., Internet), a virtual private network (VPN), and an intranet. The networks 106 may be implemented using a wireless network or any kind of physical network implementation known in the art. A client system 104 may be coupled to the host system computer 102 through multiple networks (e.g., intranet and Internet) so that not all client systems 104 are coupled to the host system computer 102 through the same network. One or more of the client systems 104 and the host system computer 102 may be connected to the networks 106 in a wireless fashion. In one exemplary embodiment, the networks 106 include an intranet and one or more client systems 104 execute a user interface application (e.g., a web browser) to contact the host system computer 102 through the networks 106. In another exemplary embodiment, the client system 104 is connected directly (i.e., not through the networks 106) to the host system computer 102 and the host system computer 102 contains memory for storing data in support of systems and methods for implementing the artifact based flexible workflow module 108. Alternatively, a separate storage device (e.g., storage device 112) may be implemented for this purpose.

In an exemplary embodiment, the storage device 112 includes a data repository with data relating to implementing the artifact based flexible workflow module 108 by the system 100, as well as other data/information desired by the entity representing the host system computer 102 of FIG. 1. The storage device 112 is logically addressable as a consolidated data source across a distributed environment that includes networks 106. Information stored in the storage device 112 may be retrieved and manipulated via the host system computer 102 and/or the client systems 104. In an exemplary embodiment, the storage device 112 includes one or more databases containing, e.g., flexible workflows, artifacts, artifact related data and corresponding configuration parameters, values, methods, and properties, as well as other related information as will be discussed more fully below. It will be understood by those of ordinary skill in the art that the storage device 112 may also comprise other structures, such as an XML file on the file system or distributed over a network (e.g., one of networks 106), or from a data stream from another server located on a network 106. In addition, all or a portion of the storage device 112 may alternatively be located on a client system 104.

The host system computer 102 depicted in the system of FIG. 1 may be implemented using one or more servers operating in response to a computer program stored in a storage medium accessible by the server. The host system computer 102 may operate as a network server (e.g., a web server) to communicate with the client systems 104. The host system computer 102 handles sending and receiving information to and from the client systems 104 and can perform associated tasks. The host system computer 102 may also include a firewall to prevent unauthorized access to the host system computer 102 and enforce any limitations on authorized access. For instance, an administrator may have access to the entire system and have authority to modify portions of the system. A firewall may be implemented using conventional hardware and/or software as is known in the art.

The host system computer 102 may also operate as an application server. The host system computer 102 executes one or more computer programs to implement the artifact based flexible workflow module 108. Host system computer 102 includes a method for implementing the artifact based flexible workflow module 108. As indicated above, processing may be shared by the client systems 104 and the host system computer 102 by providing an application (e.g., Java™ applet) to the client systems 104. Alternatively, the client system 104 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

It will be understood that the system for implementing the artifact based flexible workflow module 108 described in FIG. 1 may be implemented in hardware, software executing on a general-purpose computer, or a combination thereof.

Figure 2:
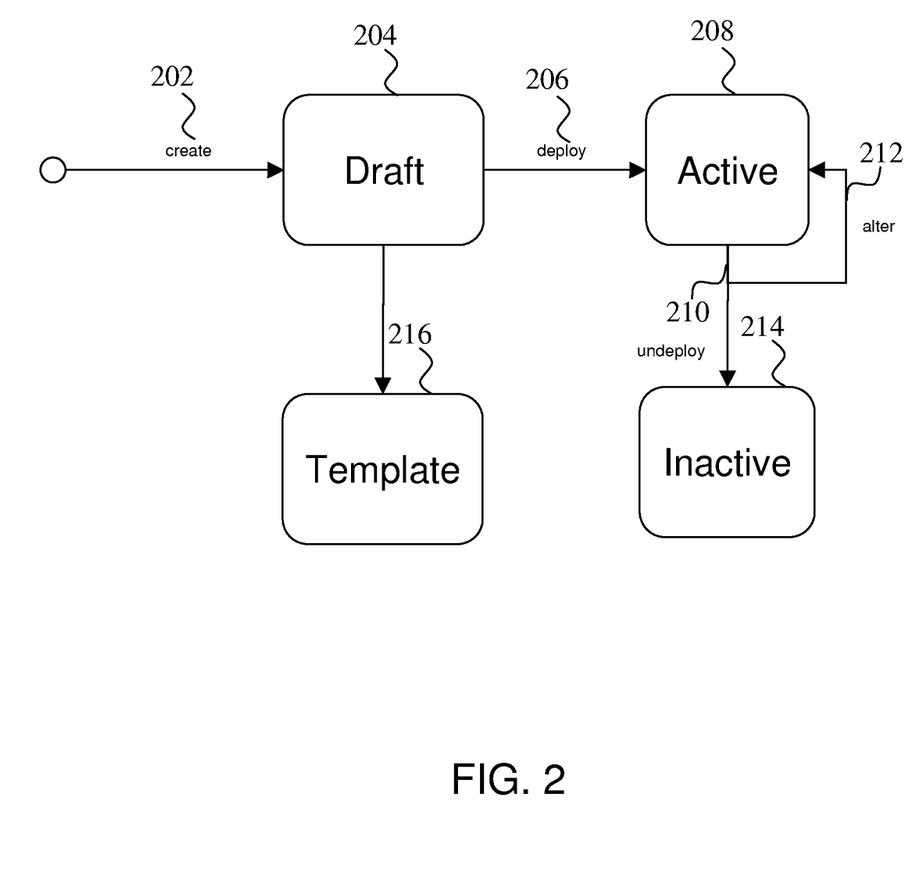
FIG. 2 illustrates a state diagram of the various states in the workflow design process lifecycle in accordance with an embodiment.

FIG. 2 illustrates a state diagram of the workflow design process lifecycle in accordance with an embodiment. In an embodiment, the design process creates a PM artifact that contains the state, data, and transition information for performing a workflow process. At transition 202, a new PM artifact instance is created. At state 204, the PM artifact enters a draft mode. When in the draft mode in state 204, the PM artifact can be saved as a template, which can be used to create additional PM artifacts. In addition, in an embodiment, from draft mode at state 204, the PM artifact can be activated through a deploy transition 206. In an embodiment, the deploy transition 206 is a transition to a production server, or other server such as the host system computer 102 of FIG. 1. In an embodiment the deploy transition 206 can move the PM artifact to a client system such as the one or more client systems 104 of FIG. 1, or any other computer or server as is known in the art.

Once the deploy transition 206 is completed, the PM artifact enters the active state 208. In an embodiment, the PM artifact instance remains active, and can instantiate a PE artifact instance, until it is inactivated. In an embodiment, the PM artifact enters the undeploy transition 210 by being manually undeployed. In an additional embodiment, the PM artifact enters the undeploy transition 210 by expiring via an expiration configuration, as is known in the art. Once the PM artifact completes the undeploy transition 210, it enters an inactive state 214, and can no longer be instantiated as a PM artifact instance. In an embodiment, the PM artifact is inaccessible by users once it enters the inactive state 214. Returning to the active state 208, the PM artifact may be modified. In an embodiment, the PM artifact is modified by an alter transition 212. In an embodiment, the alter transition requires that the PM artifact be undeployed and redeployed. In yet another embodiment, the PM artifact is modified, while active, without requiring a redeployment of the workflow process, as will be described in more detail below.

Figure 3:
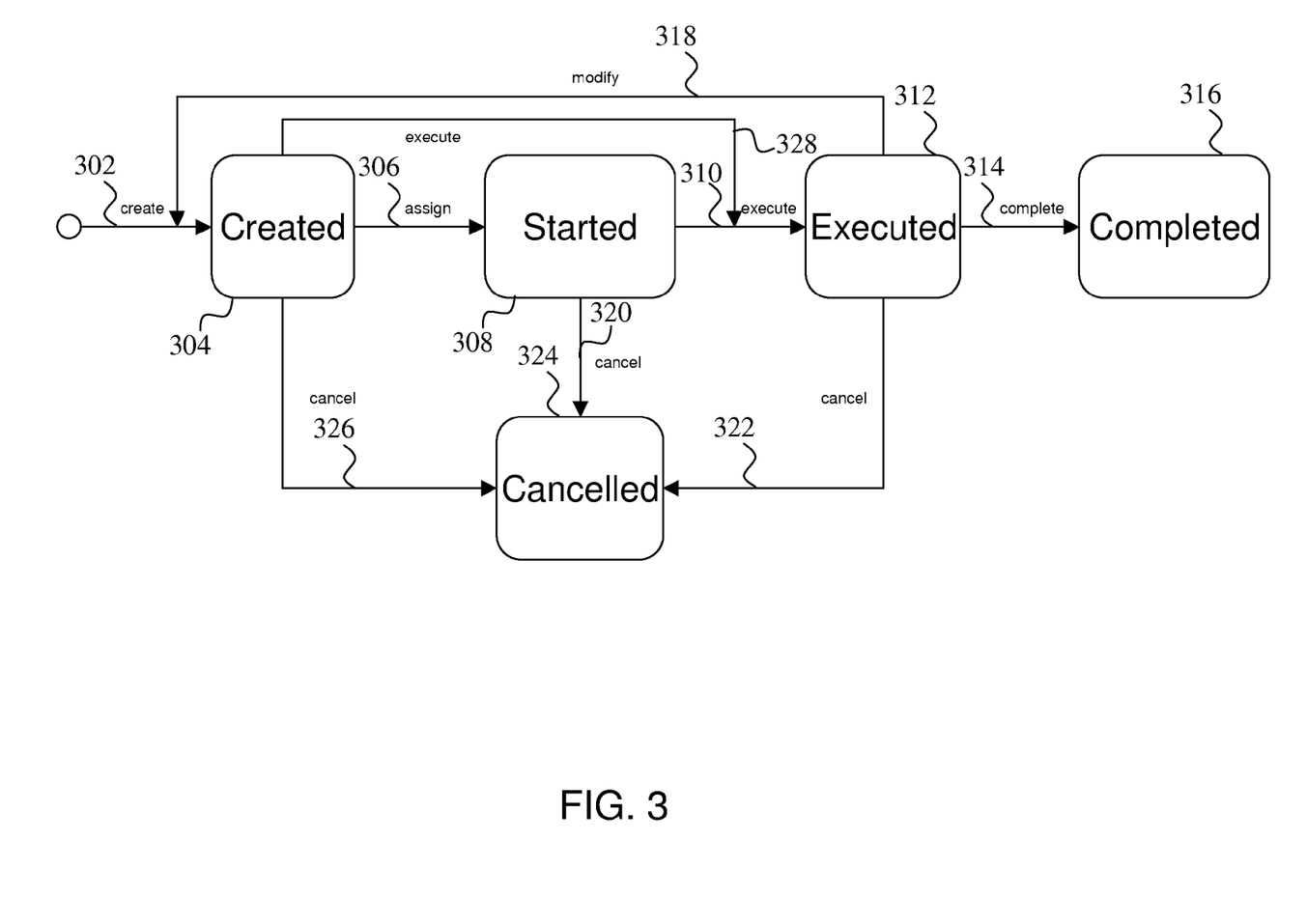
FIG. 3 illustrates a state diagram of the various states in the workflow activity lifecycle of a PE artifact in accordance with an embodiment.

FIG. 3 illustrates a state diagram of the lifecycle of a PE artifact in accordance with an embodiment. In an embodiment, the activity lifecycle state diagram depicts the various states and transitions of a workflow activity as a PE artifact instance is instantiated and executed. At a create transition 302, a new PE artifact instance is created based on a PE artifact. In an embodiment, the PE artifact is a workflow activity that was previously designed through a workflow process design flow, such as the workflow process design flow described above with regard to FIG. 2. In an embodiment, the create transition 302 is started by a triggering event, such as the receipt of a new transaction, a unit of work, the receipt of a file, or other trigger as is known in the art. After the create transition 302, the instance enters a created state 304. In an embodiment the PE artifact instance created at the created state 304 is assigned to a person or group of people at an assign transition 306. In an embodiment, the PE artifact instance is assigned automatically based on rules. In an alternate embodiment, a manager assigns the PE artifact instance. In yet another embodiment, the PE artifact instance is assigned to a user randomly based on a pool of available resources. Once the assign transition 306 is completed, the PE artifact instance enters the started state 308. In an embodiment, the started state 308 indicates that a resource has been assigned to the PE artifact instance. In an embodiment, once the resource begins processing the work associated to the PE artifact instance, the PE artifact instance undergoes an execute transition 310. Once the execute transition 310 completes, the PE artifact instance enters an executed state 312. In the executed state 312, any required post processing and reporting is completed and, in an embodiment, the PE artifact instance executes a complete transition 314. Once any required completion steps are executed, the PE artifact instance enters a completed state 316.

Returning to the executed state, in an embodiment, the PE artifact instance can execute a cancel transition 322 if it is determined that the PE artifact instance was created in error, or if the work associated with the PE artifact instance is no longer required. In an embodiment, in the cancel transition, any work associated with canceling the transaction associated with the PE artifact instance is completed. In an embodiment the work includes reversing one or more transactions, reporting, or any other tasks as is known in the art. Once the cancellation tasks are completed, the PE artifact instance enters a cancelled state 324, and the associated work is canceled.

Returning again to the executed state 312, in an embodiment, a PE artifact instance is modified, and undertakes a modify transition 318. In an embodiment, the modify transition 318 may be undertaken because an error occurred during the execute transition 310. In another embodiment, the modify transition 318 may be undertaken by modification to the requirements of the unit of work being processed by the PE artifact instance, or by an exception condition encountered during the execute transition 310. In an embodiment, the PE artifact instance executes the modify transition based on the results of one or more audits that occur while the PE artifact instance is in the executed state 312.

Returning to the started state 308, in an embodiment, the assigned user cancels the PE artifact instance and the instance undergoes a cancel transition 320. In an embodiment, the cancel transition 320 is processed similarly to the cancel transition 322. In another embodiment, the cancel transition 320 includes one or more tasks or states that differ from the cancel transition 322. Once the cancel transition 320 is completed, the PE artifact instance enters the cancelled state 324.

Returning to the created state 304, in an embodiment, the PE artifact instance takes the execute transition 328 directly. In an embodiment, this occurs when the PE artifact instance is executed programmatically without requiring an assigned resource. In an additional embodiment, the PE artifact instance undergoes the execute transition 328 directly when the PE artifact instance can be processed by a resource without requiring an assigned resource. From the execute transition 328 the PE artifact instance transitions to the executed state 312.

Returning to the created state 304, in an embodiment, the PE artifact instance undergoes the cancel transition 326. In an embodiment, the PF artifact instance is canceled when it was created in error. In an additional embodiment, the PE artifact instance is canceled when the PE artifact instance is no longer needed. Once the cancel transition 326 is completed the PE artifact instance moves to the cancelled state 324 as stated above.

The embodiment described above includes PM artifacts and PE artifacts each having fixed state machine designs. Each PE instance instantiated by a PM artifact represents a single workflow activity. The sequence dependence of each of the instantiated PE instances is contained in the information model of a PM instance. Therefore, one can change the sequence of PE instances (workflow activities) at runtime by altering the data in the information model of the corresponding PM instance.

Figure 4:
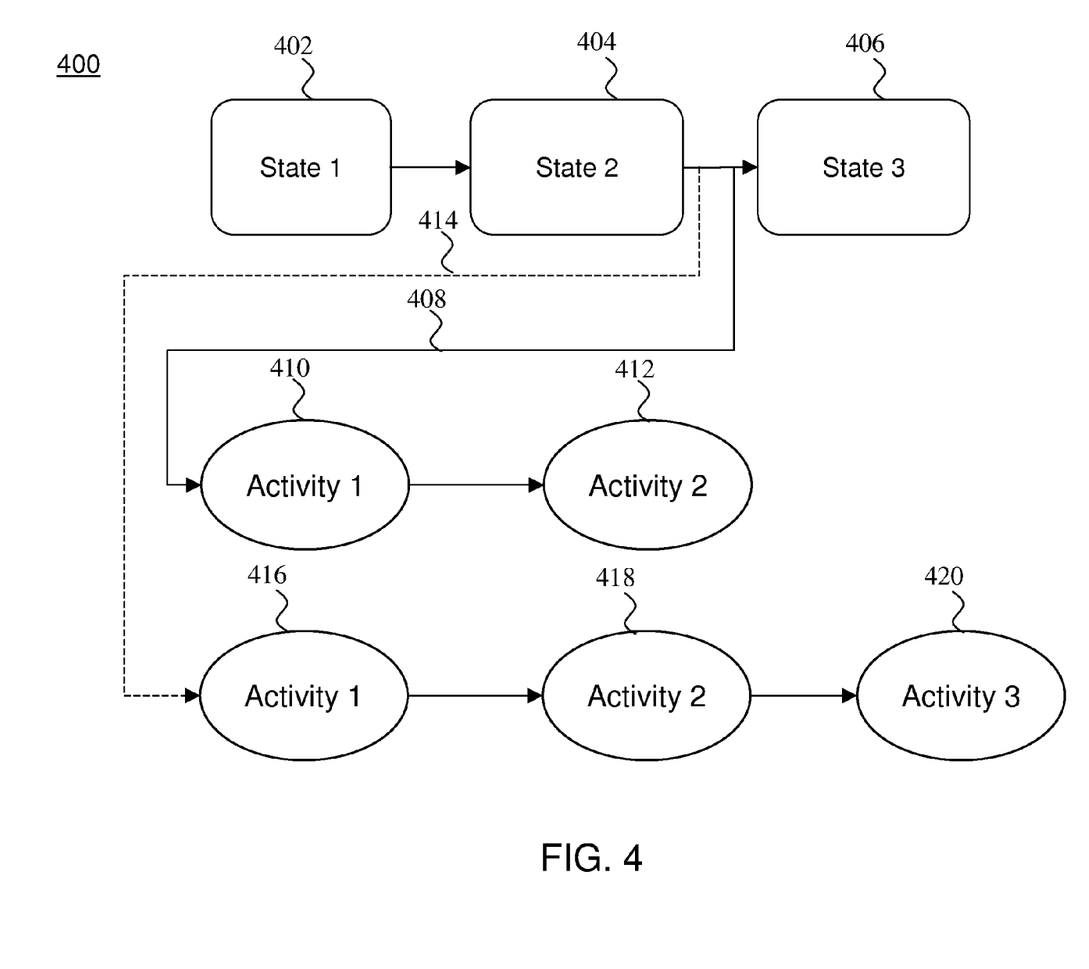
FIG. 4 illustrates a state diagram of transitions between various states in the workflow activity lifecycle of a PE artifact instance in accordance with an embodiment.

FIG. 4 illustrates a state diagram of the lifecycle of a PE artifact instance, such as PE artifact instance 400, in accordance with an additional embodiment. The embodiment depicted in FIG. 4 is a generalization of the embodiments described above, wherein the PM artifact has a fixed state machine design, but the PE artifact has a customizable state machine design. In this embodiment, the PM instance contains both state machine and activity flow designs of the PE instances. This results in greater flexibility to modify processes at runtime.

When the PE artifact instance 400 is instantiated, tables of data contained in the PE artifact instance 400 are initiated with default data stored in the PM instance described above with reference to FIG. 2, including the states, transitions, and activities that the PE artifact instance 400 is to execute. In an embodiment, the fixed states, transitions and activities of FIG. 3 are replaced by the modifiable states, transitions, and activities of FIG. 4. The PE artifact instance 400 of FIG. 4 includes three states, state 1 402, state 2 404, and state 3 406. Between pairs of states of FIG. 4 is a transition. The PE artifact from which the PE artifact instance 400 is derived is designed to follow a standard transition path 408 between state 2 404 and state 3 406. The standard transition path 408 includes two activities activity 1 410 and activity 2 412. In an embodiment, as the PE artifact instance 400 transitions between state 2 404 and state 3 406, the PE artifact instance 400 inspects the data in its tables and determines that it must complete activity 1 410 and activity 2 412 before completing the transition. In an embodiment, the data in the tables of the PE artifact instance 400 is modified after the PE artifact instance 400 has been instantiated, but before the transition between state 2 404 and state 3 406, to include a new transition path 414. In an embodiment, the new transition path 414 includes activity 1 416, activity 2 418, and activity 3 420.

In an embodiment, the PE artifact instance 400 now processes the activities associated with the new transition path 414 before transitioning to state 406. In one embodiment, each of the activities of the new transition path 414 is different from the activities of the standard transition path 408. In additional embodiments, the activities of the new transition path 414 include additional activities that are not part of the standard transition path 408. By modifying the data within the PE artifact instance 400, transitions, states, and activities are modified, deleted, and/or added to the PE artifact instance 400 without requiring the instance to be restarted, and without requiring the PE artifact to be redeployed, or modified. In an embodiment, a single PE artifact instance is modified without affecting any other PE artifact instances that are executed in parallel or instantiated concurrently. The transition paths and activities of FIG. 4 are provided for clarity only. It will be understood that, in other embodiments, other versions of the paths, activities, transitions, and states may be used in any combination.

Figure 5:
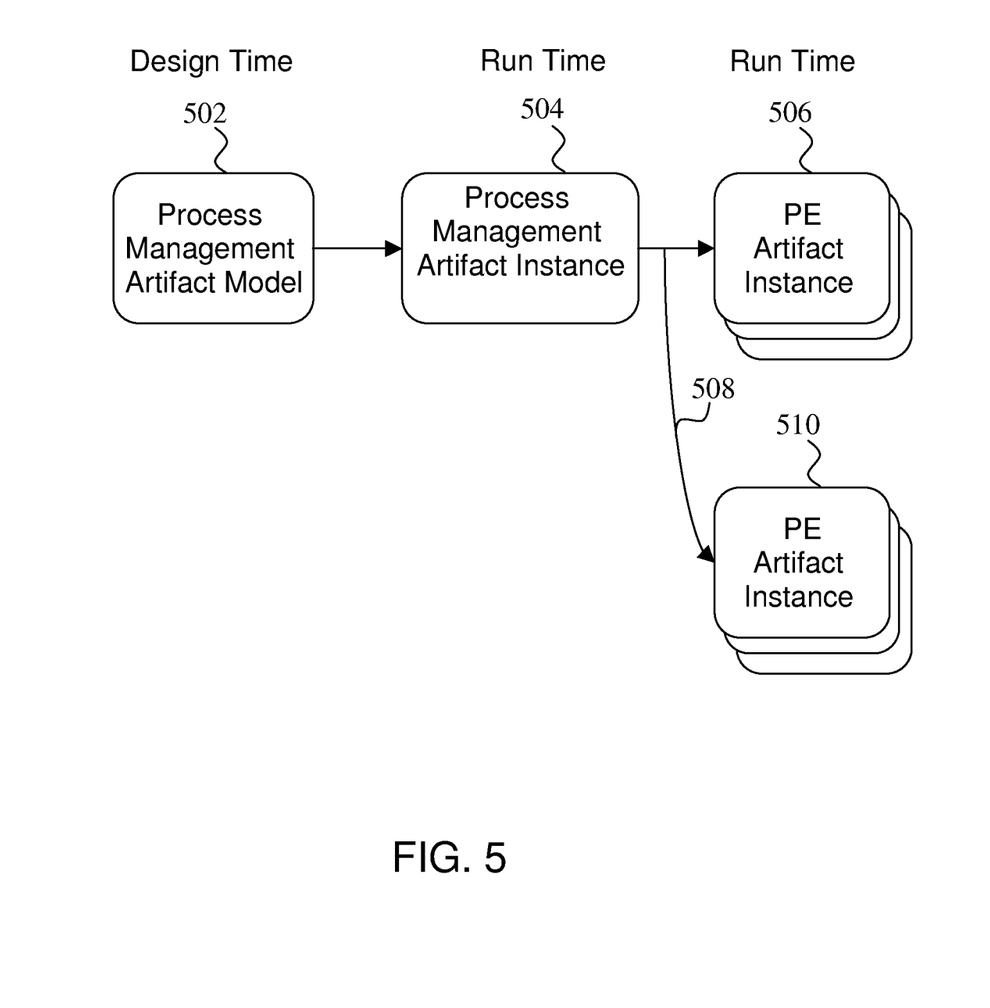
FIG. 5 illustrates a schematic of the creation of additional PE artifact instances at run time in accordance with an embodiment.

FIG. 5 illustrates a block diagram of the creation of additional PE artifact instances at run time in accordance with an embodiment. In an embodiment, a process management artifact model 502 is instantiated at runtime as a process management artifact instance 504. In an embodiment, the process management artifact instance 504 executes on the host system computer 102 of FIG. 1, and manages the instantiation and coordination of PE artifact instances from PE artifacts. In an embodiment, the process management artifact instance 504 instantiates PE artifact instances, such as the set of standard PE artifact instances 506. In an embodiment, the data prescribing PE states, transitions, and activities in a process management artifact instance 504 are modified and used to generate new PE artifact instances, such as the modified PE artifact instance set 510, by spawning a branch 508 of one or more PE execution instances with modified internal configurations.

In an embodiment, the process management artifact instance 504 is configured to generate new PE artifacts from the one or more modified PE artifact instance set 510 which then become new workflows. The block diagram of FIG. 5 is a simplified version of an embodiment for purposes of clarity. It will be understood that, in other embodiments, the process management artifact instance 504 manages a plurality of PE artifact instances including a plurality of modified PE artifact instances derived from a single PE artifact, a plurality of unmodified PE artifact instances derived from a plurality of different PE artifacts, or any combination.

Figure 6:
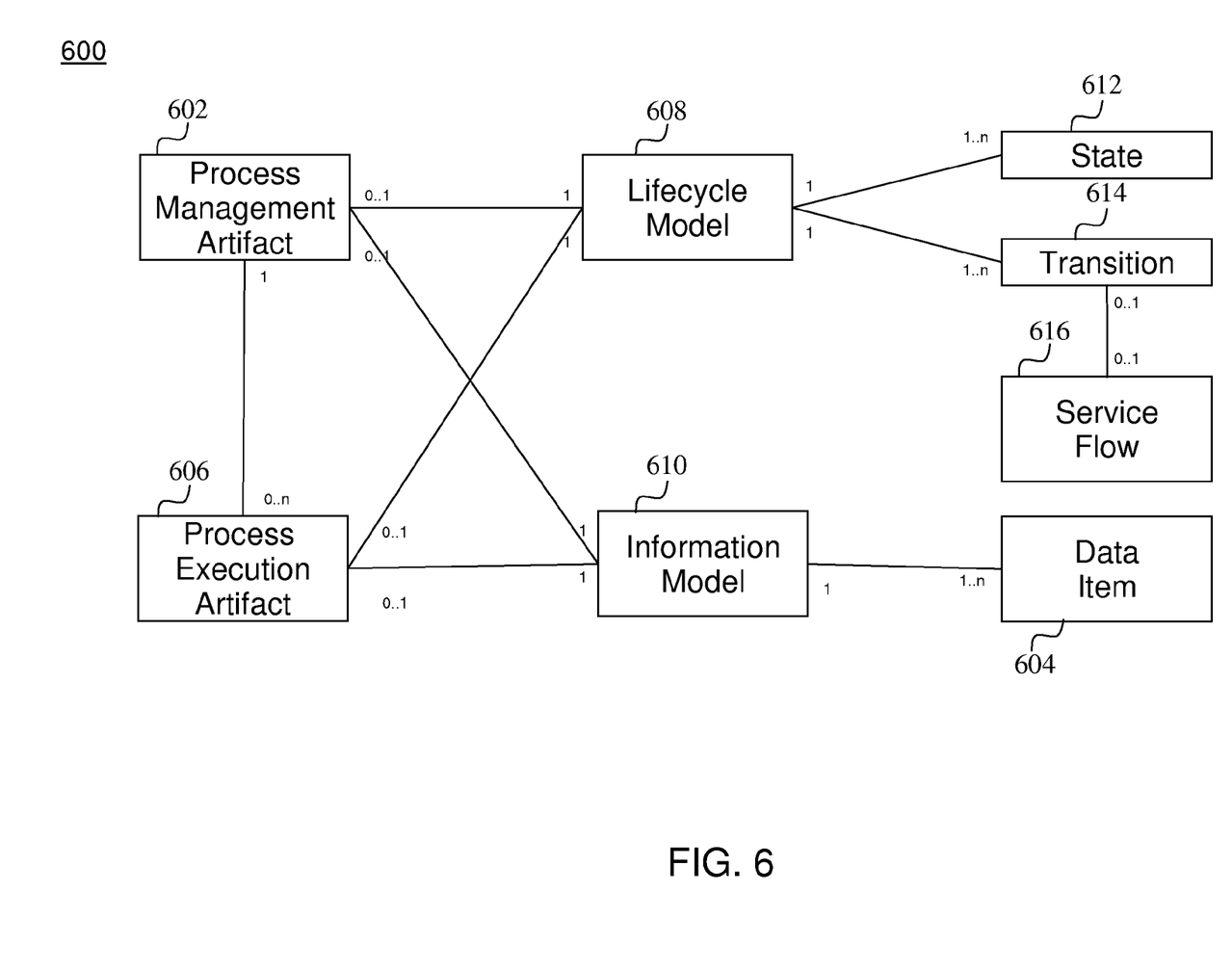
FIG. 6 illustrates a relational data model for a PE artifact and PE artifact instance in an embodiment.

FIG. 6 illustrates a data model 600 for the process management (PM) and process execution (PE) artifacts and their components in an embodiment such as the embodiment described above with regard to claim 4. The PM artifact 602 defines the parameters of a set of PE artifacts, including the PE artifact names. The PE artifact 606 includes information related to the activities performed by the business process.

The data model 600 additionally includes a lifecycle model data structure 608. Both the PM and PE artifacts have states and transitions defined in the lifecycle model data structure 608. The data model 600 further includes an information model 610. Both the PM and PE artifacts have data structures defined in the information model 610. The information model 610 includes data item data structures 604. The lifecycle model data structure 608 includes state data structures 612. The state data structure 612 defines the various possible states for a PE artifact. The data model 600 additionally includes a transition data structure 614. The transition data structure 614 defines the transitions between the various states for a PE artifact. The data model 600 further includes a service flow data structure 616. The service flow data structure 616 defines the sequence of activities that occur during a transition.

In an embodiment, a PM artifact is created, using the state diagram of FIG. 2, for example, with the associated data in the lifecycle model data structure 608, information model 610, data item data structure 604, the state data structure 612, the transition data structure 614, and the service flow data structure 616. Once the PM artifact is created, it is ready to be used in a workflow. In an embodiment, the lifecycle model data structure 608 of the PE artifacts are stored in the information model 610 of the created PM instance. In an embodiment, when a PE artifact instance is instantiated, the states, transitions, activities, and flows of the PE artifact instance are populated from the stored information model of the PM instance. In an embodiment, when there arises a business need to modify the PE artifact instance lifecycle model data structure 608 at runtime, the change is accomplished by modifying the corresponding data in the PM artifact instance information model 610 without need for redeployment.

Although the data model 600 of FIG. 6 lists various data structures and relationships between them, it will be understood that the data model 600 is presented for purposes of clarity and is a non-limiting example of a data model in an embodiment. Other data models, data structures, or methods of organizing the data associated with the PM artifacts and PE artifacts may be used in other embodiments.

Figure 7A:
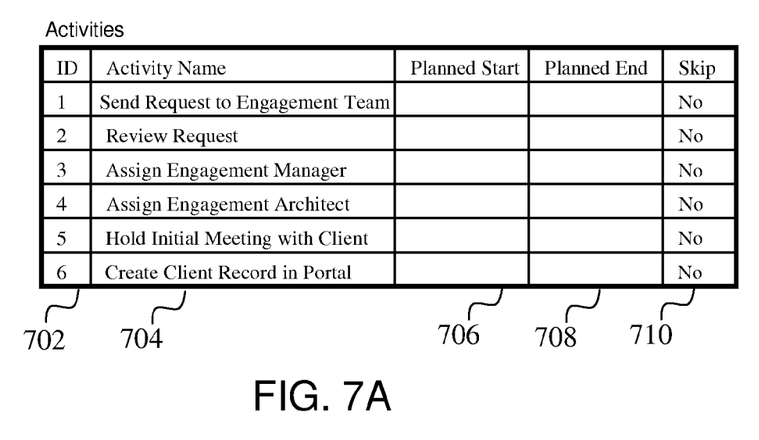
FIG. 7A illustrates a set of activities associated with a PE artifact in an embodiment.
Figure 7B:
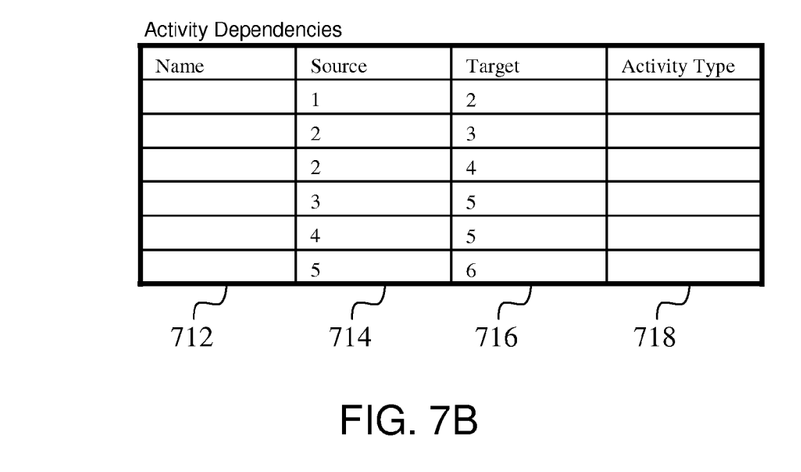
FIG. 7B illustrates activity dependency data in an embodiment.

FIGS. 7A-7B illustrate sample data for a PE artifact in an embodiment, such as the embodiment described above with regard to FIG. 3, in which each PE artifact instance represents a single activity. The sample data of FIGS. 7A-7B includes data from the various data structures of the data model 600 of FIG. 6. FIG. 7A illustrates a set of activities associated with a PE artifact in an embodiment. The activities data includes an ID field 702 for providing an ID to each activity. The activities data further includes an activity name 704, a planned start 706 for the activity, and a planned end 708 for the activity. In an embodiment, the planned start 706 and planned end 708 are defined in time and day. In an alternate embodiment the planned start 706 and planned end 708 are defined in terms of minutes, or any other segment of time. In additional embodiments, the planned start 706 and planned end 708 are defined by other measures such as the completion of other tasks. In yet another embodiment, the planned start 706 and planned end 708 are left blank. The activities data additionally includes a skip indicator 710. The skip indicator 710 indicates whether an activity will be skipped. If the skip indicator 710 indicates that the activity will not be skipped, the activity is executed, otherwise, the activity is not executed.

FIG. 7B illustrates activity dependency data in an embodiment. The activity dependency data includes a name 712 for the dependency. In addition, the activity dependency data includes a source activity ID 714, a target activity ID 716, and an activity type 718. The source activity ID 714 indicates an activity that must be completed before the activity identified by target activity ID 716 can start. The activity type 718 indicates if all of the activity dependencies with the same source activity ID 714 may be executed in parallel, or if they should be executed sequentially. In the embodiment depicted in FIG. 7B, if the PE artifact instance "Send Request to Engagement Team," has completed (i.e. activity ID 1) then the PE artifact instance "Review Request" (i.e. activity ID 2) will be executed next. The activity executions continue based on the dependencies in the activity dependency table.

In an embodiment, after a PE activity instance is instantiated, its activities and activity dependencies can be modified, as described above, in order to change the behavior of the PE activity instance.

Although the activity and activity dependency data of FIGS. 7A and 7B illustrate various data and relationships between them, it will be understood that the activity and activity dependency data is presented for purposes of clarity and is a non-limiting example of a data in an embodiment. Other data models, data structures, or methods of organizing the data associated with the PE activities and PE activity instances may be used in other embodiments.

Figure 8:
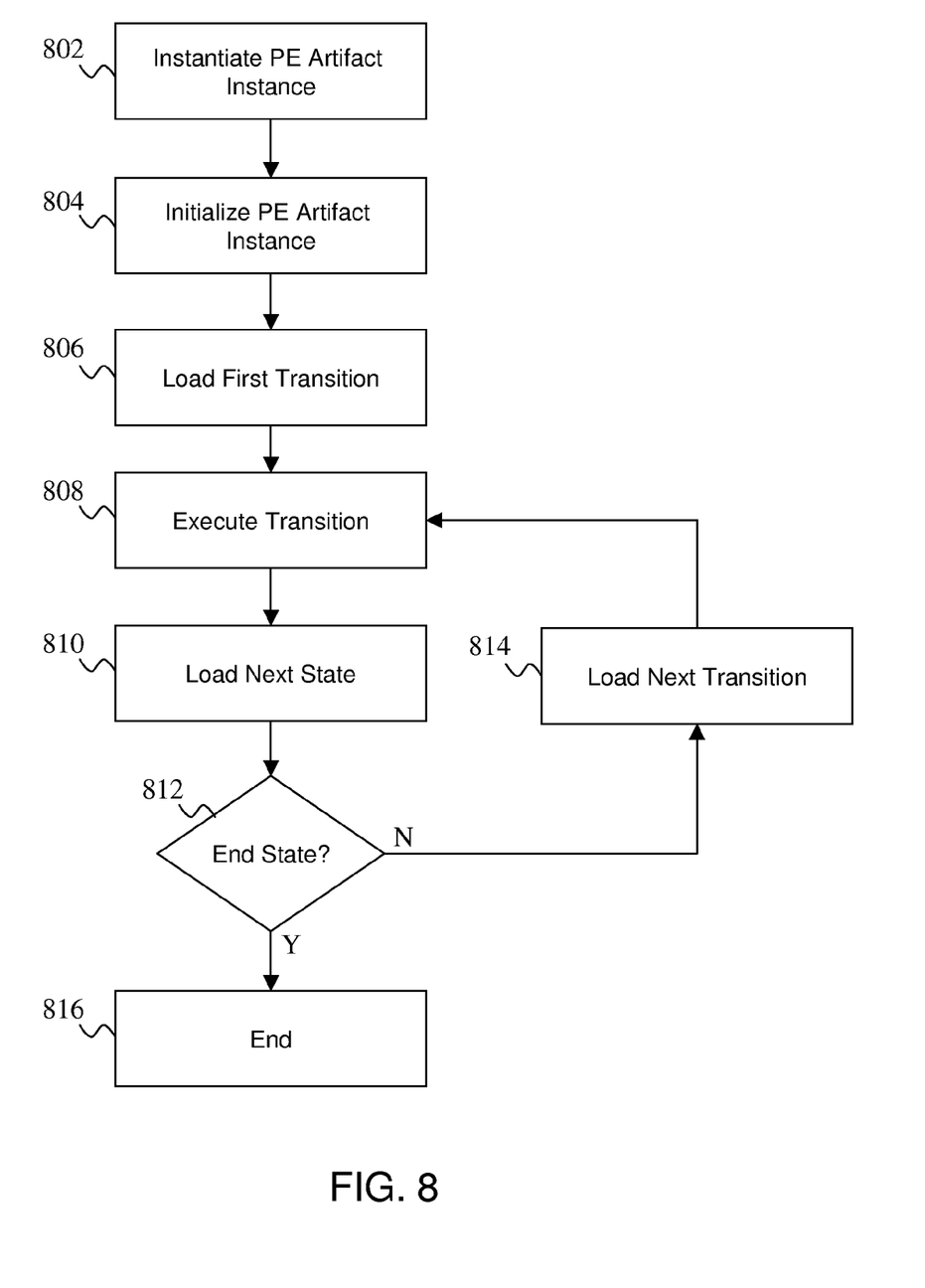
FIG. 8 illustrates a process flow for instantiating and executing a PE artifact instance in an embodiment.

FIG. 8 illustrates a process flow for instantiating and executing a PE artifact instance in a generalized embodiment such as described above with regard to FIG. 4, in which each PE artifact instance has a dynamically customizable state machine design. At block 802, a PE artifact instance is instantiated from a previously created PE artifact. At block 804, the PE artifact instance is initialized, and all data related to the PE artifact instance is loaded. At block 806, the first transition is loaded. In an embodiment, the transition is loaded from a database conforming to the data model 600 of FIG. 6. In an embodiment, the database is a relational database. At block 808, the PE artifact instance executes the activities associated with the transition as described above. At block 810, after the transition has completed executing, the next state is loaded. At block 812, if the loaded state is not an end state, then processing continues at block 814. At block 814, the next transition is loaded, and processing continues at block 808. Returning to block 812, if the loaded state is an end state, the process ends at block 816.

In an embodiment, any changes performed before the loading of any of transitions, and loading of any of the states will cause the PE artifact instance to execute based on the modifications, without requiring a PE instance to be reinstantiated, restarted, or paused.

Technical effects and benefits include the ability to modify a workflow without requiring a restart of the workflow process. An additional benefit is the ability to modify an instantiated workflow process in mid execution based on an exception in both a state and during a transition. Yet another benefit is the ability to store modified versions of a workflow process to use as a template for creating new workflows based on the modified workflow.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be constructed to maintain the proper protection for the invention first described.

What is claimed is:

1. A system for execution of flexible workflows using artifacts, comprising:
    a workflow execution engine that executes on a computer processor, the workflow execution engine configured to:
    instantiate a process execution (PE) artifact, the PE artifact comprising one or more transitions, each of the one or more transitions comprising a service flow, the service flow comprising one or more workflow activity;
    execute the one or more transitions by completing the one or more workflow activity;
    determine if any of the one or more transitions are new or modified; and
    load and execute new or modified transitions, without reinstantiating the PE artifact, responsive to determining that at least one new or modified transitions exist.

2. The system of claim 1, wherein the PE artifact is instantiated by a process management (PM) artifact instance.

3. The system of claim 2, wherein the PM artifact instance comprises a data model, the data model including an execution sequence of a plurality of PE artifact instances, wherein a change to data in the data model results in a corresponding change to the execution sequence of the plurality of PE artifact instances.

4. The system of claim 3, wherein the data model further comprises data corresponding to the one or more transitions, wherein a change to the data corresponding to the one or more transitions in the data model results in a corresponding change to the one or more transitions of the PE artifact.

5. The system of claim 1, wherein the one or more transitions are stored in a relational database, and the one or more transitions are modified by updating transitions in the relational database.

6. The system of claim 1, wherein at least one of the one or more transitions are modified, and the modified transitions are stored as a new PE artifact.

7. The system of claim 1, wherein the one or more transitions are modified at runtime responsive to determining that a workflow exception exists.

8. A method for execution of flexible workflows using artifacts, comprising:
   instantiating, by a computer, a process execution (PE) artifact, the PE artifact comprising one or more transitions, each of the one or more transitions comprising a service flow, the service flow comprising one or more workflow activity;
   executing, with the computer, the one or more transitions by completing the one or more workflow activity;
   determining if any of the one or more transitions are new or modified; and
   loading and executing new or modified transitions, without reinstantiating the PE artifact, responsive to determining that at least one new or modified transitions exist.

9. The method of claim 8, wherein the PE artifact is instantiated by a process management (PM) artifact instance.

10. The method of claim 9, wherein the PM artifact instance comprises a data model, the data model including an execution sequence of a plurality of PE artifact instances, wherein a change to data in the data model results in a corresponding change to the execution sequence of the plurality of PE artifact instances.

11. The method of claim 10, wherein the data model further comprises data corresponding to the one or more transitions, wherein a change to the data corresponding to the one or more transitions in the data model results in a corresponding change to the one or more transitions of the PE artifact.

12. The method of claim 8, wherein the one or more transitions are stored in a relational database, and the one or more transitions are modified by updating transitions in the relational database.

13. The method of claim 8, wherein at least one of the one or more transitions are modified, and the modified transitions are stored as a new PE artifact.

14. The method of claim 8, wherein the one or more transitions are modified at runtime responsive to determining that a workflow exception exists.

15. A computer program product for execution of flexible workflows using artifacts, the computer program product comprising:
   a non-transitory storage medium readable by a processing circuit and storing instructions for execution by the processing circuit for performing a method, comprising:
      instantiating a process execution (PE) artifact, the PE artifact comprising one or more transitions, each of the one or more transitions comprising a service flow, the service flow comprising one or more workflow activity;
      executing the one or more transitions by completing the one or more workflow activity;
      determining if any of the one or more transitions are new or modified; and
      loading and executing new or modified transitions, without reinstantiating the PE artifact, responsive to determining that at least one new or modified transitions exist.

16. The computer program product of claim 15, wherein the PE artifact is instantiated by a process management (PM) artifact instance.

17. The computer program product of claim 16, wherein the PM artifact instance comprises a data model, the data model including an execution sequence of a plurality of PE artifact instances, wherein a change to data in the data model results in a corresponding change to the execution sequence of the plurality of PE artifact instances.

18. The computer program product of claim 17, wherein the data model further comprises data corresponding to the one or more transitions, wherein a change to the data corresponding to the one or more transitions in the data model results in a corresponding change to the one or more transitions of the PE artifact.

19. The computer program product of claim 15, wherein the one or more transitions are stored in a relational database, and the one or more transitions are modified by updating transitions in the relational database.

20. The computer program product of claim 15, wherein at least one of the one or more transitions are modified, and the modified transitions are stored as a new PE artifact.

* * * * *